(12) United States Patent
Fouda et al.

(10) Patent No.: US 9,964,659 B2
(45) Date of Patent: May 8, 2018

(54) HIGH DIRECTIONALITY GALVANIC AND INDUCTION WELL LOGGING TOOLS WITH METAMATERIAL FOCUSING

(71) Applicant: Halliburton Energy Services, Inc., Houston, TX (US)

(72) Inventors: Ahmed E. Fouda, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 11 days.

(21) Appl. No.: 14/767,248

(22) PCT Filed: Jul. 31, 2014

(86) PCT No.: PCT/US2014/049189
§ 371 (c)(1),
(2) Date: Aug. 11, 2015

(87) PCT Pub. No.: WO2016/018381
PCT Pub. Date: Feb. 4, 2016

(65) Prior Publication Data
US 2016/0266271 A1    Sep. 15, 2016

(51) Int. Cl.
*G01V 3/10* (2006.01)
*G01V 3/18* (2006.01)
(Continued)

(52) U.S. Cl.
CPC .............. *G01V 3/30* (2013.01); *G01V 3/20* (2013.01); *G01V 3/28* (2013.01)

(58) Field of Classification Search
CPC ... G02B 3/00; G02B 6/32; G01V 3/28; G01V 3/30; E21B 47/12; E21B 49/00
(Continued)

(56) References Cited

U.S. PATENT DOCUMENTS 6,859,114 B2    2/2005  Eleftheriades et al.
7,218,285 B2    5/2007  Davis et al.
(Continued)

FOREIGN PATENT DOCUMENTS

CN      102822447 A    12/2012
WO      2013072844 A1    5/2013
(Continued)

OTHER PUBLICATIONS

Kao, T.S., Digitally Addressable Focusing of Light into a Subwavelength Hot Spot.
(Continued)

*Primary Examiner* — Steven Yeninas
(74) *Attorney, Agent, or Firm* — Polsinelli PC

(57) ABSTRACT

Metamaterials are used in well logging measurement tools to provide high directionality galvanic and induction tools having metamaterial focusing. Using metamaterial lenses, currents injected by galvanic tools can be focused in both axial and azimuthal directions. In addition, the focus plane can be shifted away from the tool body into a borehole formation, making measurements more sensitive to zones of interest and less sensitive to boreholes and invaded zones. Another metamaterial lens can bend injected currents toward the head of the tool, adding a look-ahead functionality.

14 Claims, 16 Drawing Sheets

(51) Int. Cl.
  *G01V 3/30* (2006.01)
  *G01V 3/28* (2006.01)
  *G01V 3/20* (2006.01)
(58) Field of Classification Search
  USPC .................. 73/152.55, 152.5; 250/505.1;
    324/324–375; 333/909, 912; 359/237,
    359/238, 278, 641, 642, 652, 653, 654,
    359/665, 708; 385/33
  See application file for complete search history.

(56) References Cited

U.S. PATENT DOCUMENTS

| | | | |
|---|---|---|---|
| 7,629,941 | B2 | 12/2009 | Pendry et al. |
| 7,741,933 | B2 | 6/2010 | Duwel et al. |
| 7,864,394 | B1 | 1/2011 | Rule et al. |
| 8,013,316 | B2 | 9/2011 | Eleftheriades |
| 8,017,894 | B2 | 9/2011 | May et al. |
| 8,040,586 | B2 | 10/2011 | Smith et al. |
| 8,493,281 | B2 | 7/2013 | Lam et al. |
| 2004/0196047 | A1 | 10/2004 | Fanini et al. |
| 2006/0155471 | A1 | 7/2006 | Tabarovsky et al. |
| 2009/0294668 | A1 | 12/2009 | Bowers et al. |
| 2009/0296223 | A1 | 12/2009 | Werner et al. |
| 2010/0134898 | A1 | 6/2010 | Shalaev et al. |
| 2010/0156573 | A1 | 6/2010 | Smith et al. |
| 2010/0225562 | A1 | 9/2010 | Smith |
| 2010/0229749 | A1 | 9/2010 | Veneruso |
| 2010/0265006 | A1 | 10/2010 | Bowers et al. |
| 2012/0018653 | A1 | 1/2012 | Bowers et al. |
| 2012/0212395 | A1 | 8/2012 | Sanada |
| 2012/0328240 | A1 | 12/2012 | Ma et al. |
| 2014/0298900 | A1* | 10/2014 | Clarke .................... E21B 49/00 73/152.55 |
| 2015/0218941 | A1* | 8/2015 | Clarke .................... E21B 49/08 324/324 |

FOREIGN PATENT DOCUMENTS

| | | |
|---|---|---|
| WO | 2014003786 A1 | 1/2014 |
| WO | 2014027322 A2 | 2/2014 |

OTHER PUBLICATIONS

Shreiber, D., Microwave nondestructive evaluation of dielectric materials with a metamaterials lens; 2008.

Zhang,Shu, Focusing Ultrasound with Acoustic Metamaterial Network, 2009.

Teixeira, Fernando, Time-Domain Finite-Difference and Finite-Element Methods for Maxwell Equations in Complex Media, 2008.

Jiang, Wei Xiang, et al., "Enhancement of current density by DC electric concentrator." Scientific reports 2 (2012).

Pendry, John B., et al., "Controlling electromagnetic fields." Science 312, No. 5781 (2006): 1780-1782.

Pendry, Sir John. "Metamaterials and the control of electromagnetic fields." In Conference on Conherence and Quantum Optics. Optical Society of America, 2007.

Kwon, Do-Hoon, et al., "Transformation electromagnetics: an overview of the theory and applications." Antennas and Propagation Magazine, IEEE and applications. Antennas and Propagation Magazine, IEEE 52, No. 1 (2010): 24-46.

Rahm, Marco, et al., "Optical design of reflectionless complex media by finite embedded coordinate transformations." Physical Review Letters 100, No. 6 (2008): 063903.

Schurig, David, J. J. Mock, et al., "Metamaterial electromagnetic cloak at microwave frequencies." Science 314, No. 5801 (2006): 977-980.

Tichit, Paul-Henri, et al, "Antenna Design Concepts Based on Transformation Electromagnetics Approach." Radioengineering 21, No. 4 (2012): 955.

Smith, D. R., et al, "Determination of effective permittivity and permeability of metamaterials from reflection and transmission coefficients." Physical Review B 65, No. 19 (2002): 195104.

Wilson, Jeffrey D., et al., "Multifocal flat lens with left-handed metamaterial." Applied Physics Letters 86, No. 2 (2005): 021113-021113.

Erentok, Aycan, et al. "Low frequency lumped element based negative index metamaterial." Applied Physics Letters 91, No. 18 (2007): 184104-184104.

Freire, Manuel J., et al., "Experimental demonstration of a $\mu=-1$ metamaterial lens for magnetic resonance imaging." Applied Physics Letters 93 (2008): 231108.

Xie, Yihong, et al., "Proposal of cylindrical rolled-up metamaterial lenses for magnetic resonance imaging application and preliminary experimental demonstration." Progress in Electromagnetics Research 124 (2012): 151-162.

Pendry, J. B., "A chiral route to negative refraction." Science 306, No. 5700 (2004):1353-1355.

Magnus, F., et al., "A DC magnetic metamaterial." Nature materials 7, No. 4 (2008): 295-297.

Gömöry, Fedor, et al., "Experimental realization of a magnetic cloak." Science 335, No. 6075 (2012): 1466-1468.

Narayana, Supradeep, et al., "DC magnetic cloak." Advanced Materials 24, No. 1 (2012): 71-74.

International Search Report and Written Opinion dated Apr. 24, 2015 in International Application No. PCT/US2014/049189.

Extended European Search Report dated Nov. 14, 2017.

\* cited by examiner

HIGH DIRECTIONALITY GALVANIC AND INDUCTION WELL LOGGING TOOLS WITH METAMATERIAL FOCUSING

CROSS-REFERENCE TO RELATED APPLICATIONS

This application is a national stage entry of PCT/US2014/049189 filed Jul. 31, 2014, said application is expressly incorporated herein in its entirety.

FIELD

The subject matter herein generally relates to metamaterials used for focusing electromagnetic fields in galvanic and induction logging tools.

BACKGROUND

Metamaterials are artificially-engineered composites that inherit their electrical properties from the geometry and arrangement of their constituting unit cells. Metamaterials can be realized in many different ways depending on the operation frequency. Metamaterials designed according to transformation optics rules exhibit iso-impedance; in other words metamaterials have substantially the same intrinsic impedance as a background medium, and therefore introduce substantially no spurious reflections.

BRIEF DESCRIPTION OF THE DRAWINGS

Implementations of the present technology will now be described, by way of example only, with reference to the attached figures, wherein.

DETAILED DESCRIPTION

Figure 1A:
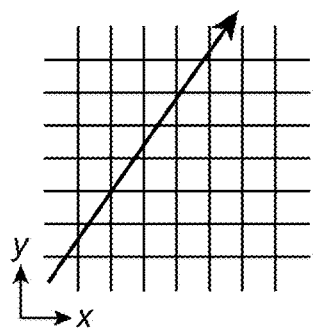
FIGS. 1A-1D are diagrams illustrating the principles of transformation optics which are used in the design of metamaterials.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, are descriptive of a relationship with, and are used with reference to, the bottom or furthest extent of the surrounding wellbore, even though the wellbore or portions of it may be deviated or horizontal. Correspondingly, the transverse, axial, lateral, longitudinal, radial, etc., orientations shall mean orientations relative to the orientation of the surrounding wellbore or wellbore tool in question. Additionally, the non-limiting embodiments within this disclosure are illustrated such that the orientation is such that the right-hand side is down hole compared to the left-hand side.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, even if the object is not exactly circular or cylindrical. The term "axially" means substantially along a direction of the axis of the object. If not specified, the term axially is such that it refers to the longer axis of the object.

"Processor" as used herein is an electronic circuit that can make determinations based upon inputs and is interchangeable with the term "controller". A processor can include a microprocessor, a microcontroller, and a central processing unit, among others. While a single processor can be used, the present disclosure can be implemented over a plurality of processors, including local controllers in a tool or sensors along the drill string.

The present disclosure is described in relation to metamaterials. Metamaterials are artificially-engineered composites that inherit their electrical properties from the geometry and arrangement of their constituting unit cells. Metamaterials can be designed to control electromagnetic fields in ways not achievable by conventional materials.

The metamaterial design and realization techniques described herein employ resonant structures, making the metamaterial highly dispersive and lossy when operated near resonance. This also means that a metamaterial with given properties can only be designed to operate at a single frequency. The use of metamaterials also extends to quasi-static and DC applications, such as for a DC diamagnetic metamaterial, for a DC magnetic cloak, and for a DC electric concentrator. Negative index of refraction metamaterial can also be used in enhanced material investigation tools. The metamaterial focuses electromagnetic energy for deeper depth of investigation yielding more efficient use of the available power. One use includes an electromagnetic measurement tool within a borehole that measures formation properties associated with oil exploration.

In the present disclosure, metamaterials may focus electromagnetic fields in galvanic and induction logging tools. In galvanic tools, a metamaterial current-shaping lens may be used to inject current at an angle to achieve focusing in both vertical and azimuthal directions. The metamaterial lens shifts the current focusing plane away from the tool body into the formation. As a result, measurements become less sensitive to the borehole and the invaded zone. In another embodiment, a metamaterial lens is used to focus electromagnetic waves along the axis of the tool, which adds a "look-ahead" capability to conventional galvanic and induction type well logging tools. In yet another embodiment, a frequency-switched metamaterial lens is provided to improve the azimuthal resolution of induction-based borehole imaging tools.

According to the present disclosure, metamaterials can be advantageous in well logging electromagnetics for a number of reasons. The constraining geometries in well logging can be alleviated by introducing appropriate spatial transformations realized using metamaterials. Metamaterials enable narrow band, single-frequency operation of most tools relevant to this disclosure. Metamaterials accommodate the regular cylindrical geometry of most tools relevant to this disclosure. The generally low operating frequencies of such tools enhance the application of the homogenization condition described above. Furthermore, electric and magnetic fields are decoupled in many tools relevant to this disclosure; this decoupled relationship facilitates the realization of metamaterials using a reduced set of material properties.

Another reason that metamaterials can be advantageous in well logging electromagnetics is that the predefined field polarization of most tools relevant to this disclosure facilitates the design of an appropriate metamaterial using a reduced set of parameters. Additionally, if SNG and DNG are not needed, non-resonant, low loss metamaterials operating at wavelengths much longer than the unit cell can be designed.

Figure 1B:
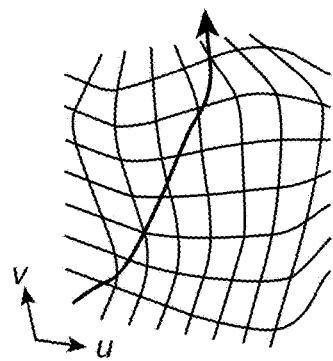

FIGS. 1A-1D conceptually illustrate metamaterials. FIG. 1A shows an original two-dimensional space defined by a grid. If it is assumed that the underlying grid is "elastic" and can be transformed to achieve certain field shaping as shown in FIG. 1B, the form-invariance of Maxwell's equations under coordinate transformation means that such transformations can be interpreted as if the original medium within the transformed space is replaced by a generally anisotropic and inhomogeneous medium. Materials having such properties may not exist in nature and therefore are referred to as "metamaterials."

Figure 1C:
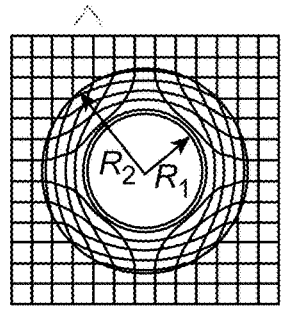
Figure 1D:
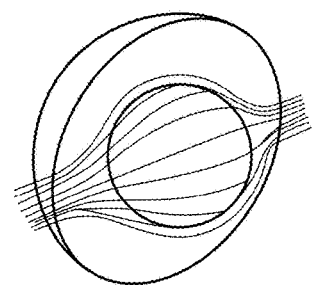

As shown in FIG. 1C, the original grid space is transformed to create an enclosure in the inner region ($\rho < R_1$) while maintaining the original grid in the outer region ($\rho > R_2$.) The region where ($R_1 < \rho < R_2$) is the region in which one or more metamaterial is used to mimic the illustrated grid deformation. This deformation allows light rays to be smoothly steered around the enclosure in the inner region, rendering invisible any object placed in the enclosure. A three-dimensional depiction of such "invisibility cloaking" is shown in FIG. 1D.

Mathematically, transformation optics can be described using Maxwell's equations. In the original space, we have the equations:

$$\nabla \times E = -j\omega\mu H$$

$$\nabla \times H = j\omega\epsilon E + J_s \quad (1)$$

Given the following spatial transformation in cylindrical coordinates:

$$\rho' = \rho'(\rho,\varphi,Z)$$

$$\varphi' = \varphi'(\rho,\varphi,Z)$$

$$Z' = Z'(\rho,\varphi,Z)$$

Maxwell's equations take the following form, as they are form-invariant under coordinate transformation:

$$\nabla' \times E' = -j\omega\mu' H' \quad (3)$$
$$\nabla' \times H' = j\omega\epsilon' E' + J'_s$$

where $$\mu' = \frac{A\mu A^T}{|A|} \quad (4)$$

$$\epsilon' = \frac{A\epsilon A^T}{|A|}$$

$$J'_s = \frac{AJ_s|J_s|}{|AJ_s|}$$

and $$A = \begin{bmatrix} \frac{\partial \rho'}{\partial \rho} & \frac{\partial \rho'}{\rho \partial \phi} & \frac{\partial \rho'}{\partial z} \\ \frac{\rho' \partial \phi'}{\partial \rho} & \frac{\rho' \partial \phi'}{\rho \partial \phi} & \frac{\rho' \partial \phi'}{\partial z} \\ \frac{\partial z'}{\partial \rho} & \frac{\partial z'}{\rho \partial \phi} & \frac{\partial z'}{\partial z} \end{bmatrix} \quad (5)$$

is the Jacobian matrix of the transformation.

The above equation (4) represents the material properties and the equivalent current source that should be used to realize the prescribed coordinate transformation. Transformations that preserve grid continuity across the transformed space boundary result in reflectionless, iso-impedance metamaterials. Another class of transformations exists, called embedded transformations, in which the grid continuity is broken and therefore reflectionless transmission across the metamaterial/background medium interface is not guaranteed. However, embedded transformations provide higher degrees of flexibility for manipulating fields outside the metamaterial device, and can be designed in such a way to minimize spurious reflections.

Figure 2A:
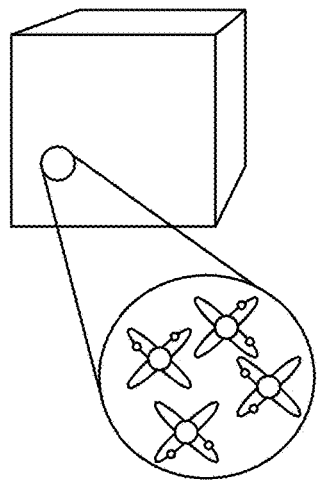
FIGS. 2A-2B are diagrams illustrating the macroscopic properties of conventional materials versus metamaterials.
Figure 2B:
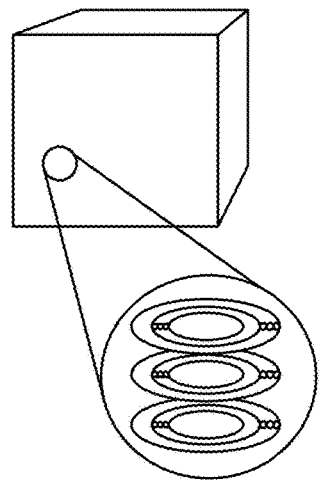

Thus, as conceptually shown in FIG. 2A, while conventional materials attain their macroscopic properties from the chemical composition of their constituting atoms, metamaterials as conceptually shown in FIG. 2B attain their macroscopic properties from their artificially engineered constituting unit cells. Metamaterials have been realized in many different ways depending on the application and frequency of operation. Examples of metamaterials summarized below demonstrate their practical feasibility in the current applications.

Figure 3A:
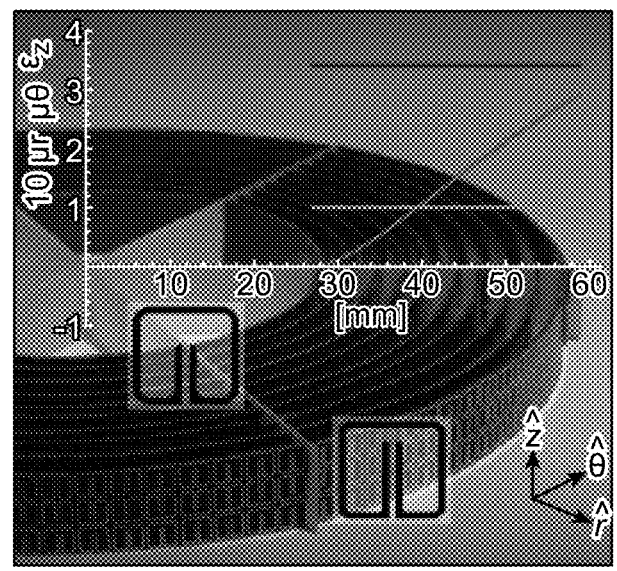
FIG. 3A is a diagram of a mufti-cylinder split ring resonators SRR metamaterial.

FIG. 3A shows a metamaterial constructed in the form of concentric cylinders having split ring resonators (SRRs) printed thereon. A two-dimensional invisibility cloak requires the radial component of the permeability tensor ($\mu_{rr}$) to vary radially as shown in the inset of FIG. 3A. The dimensions of the SRRs are adjusted in each cylinder to achieve the required profile. In order to describe the assembly of SRRs with effective macroscopic material properties, the dimension of the unit cell must be much smaller than the desired operating wavelength, which is known in the art as the homogenization condition. Nevertheless, the dimension of the SRR must be large enough to resonate at or near the operating frequency.

Figure 3B:
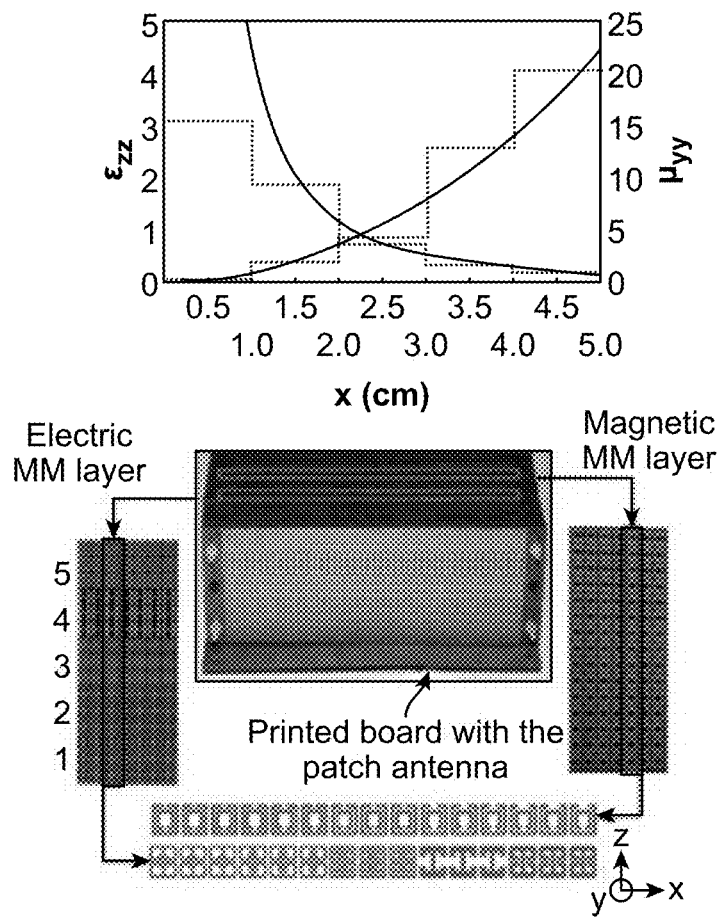
FIG. 3B is a diagram of a directive metamaterial antenna.

FIG. 3B shows an example metamaterial wherein a directive antenna is realized using alternating electric and magnetic metamaterial layers. The electric layers realize the shown discrete $\epsilon_{zz}$ profile using five sets of electric-LC (ELC) resonators. The magnetic layers realize the shown discrete $\mu_{yy}$ profile using SRRs.

Figure 4:
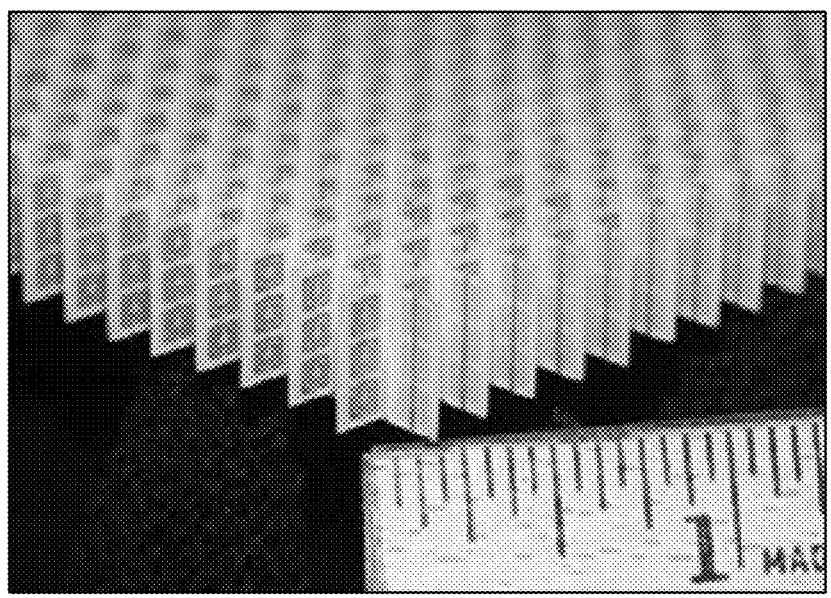
FIG. 4 is a diagram of a negative index of refraction (NIR) lens in which double negative (DNG) metamaterial is employed.

Another example metamaterial construct is shown in FIG. 4. This figure illustrates a negative index of refraction (NIR) lens, in which double negative (DNG) metamaterials are used. Negative permeability is realized using SRRs, whereas negative permittivity is realized using thin wires.

Figure 5A:
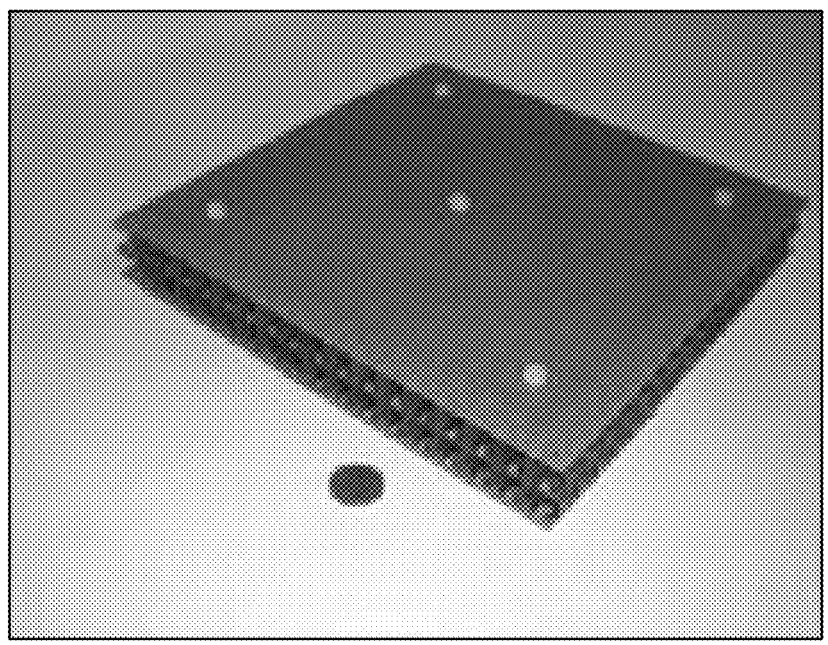
FIGS. 5A-5B are diagrams of a capacitively loaded metamaterial SNG flat lens.
Figure 5B:
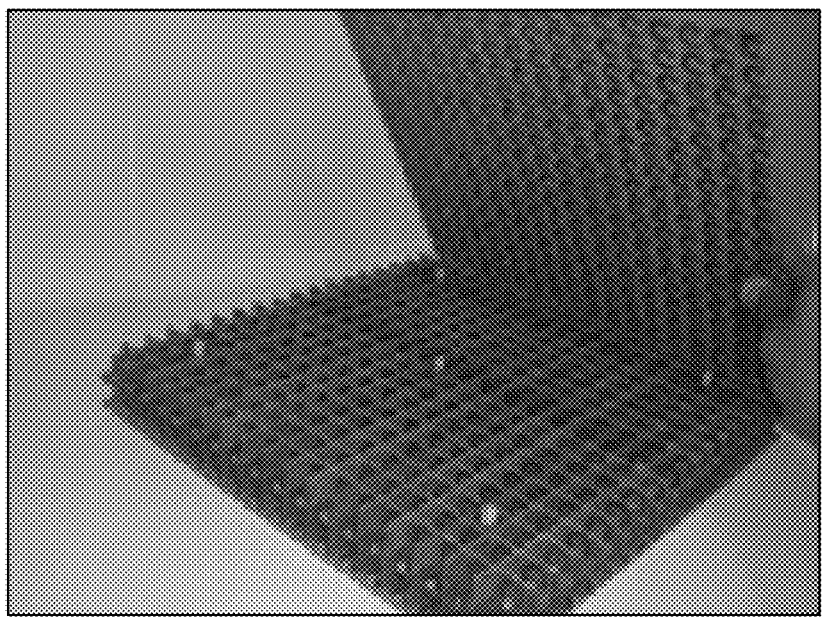
Figure 5C:
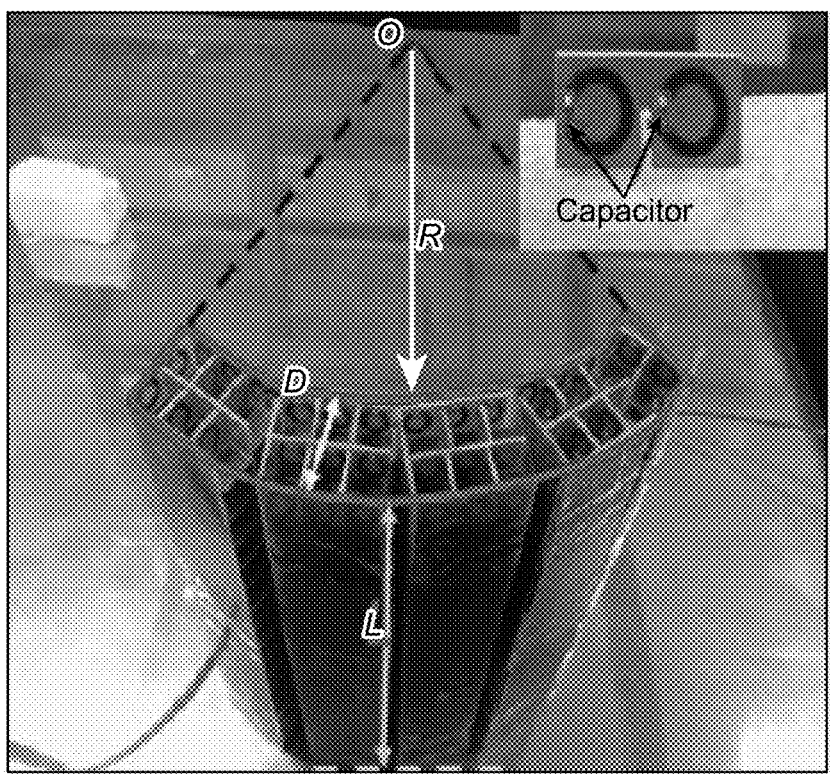
FIG. 5C shows a capacitively loaded metamaterial single negative (SNG) cylindrical rolled-up lens.

At lower operating frequencies, the dimensions of the SRRs and ELCs which are required in order to resonate at the operating frequency become prohibitively large for practical implementation. For such frequencies, lumped components can be used to achieve resonance without increasing the unit cell size. An example of single negative (SNG) lenses is shown in FIGS. 5A-5C, wherein FIG. 5A shows a flat SNG lens in its operative configuration, FIG. 5B shows the internal capacitor unit cell structure and FIG. 5C shows a cylindrical rolled-up SNG lens. SNG lenses have been used to enhance the sensitivity and spatial resolution of RF coils in magnetic resonance imaging (MRI) systems.

Figure 6:
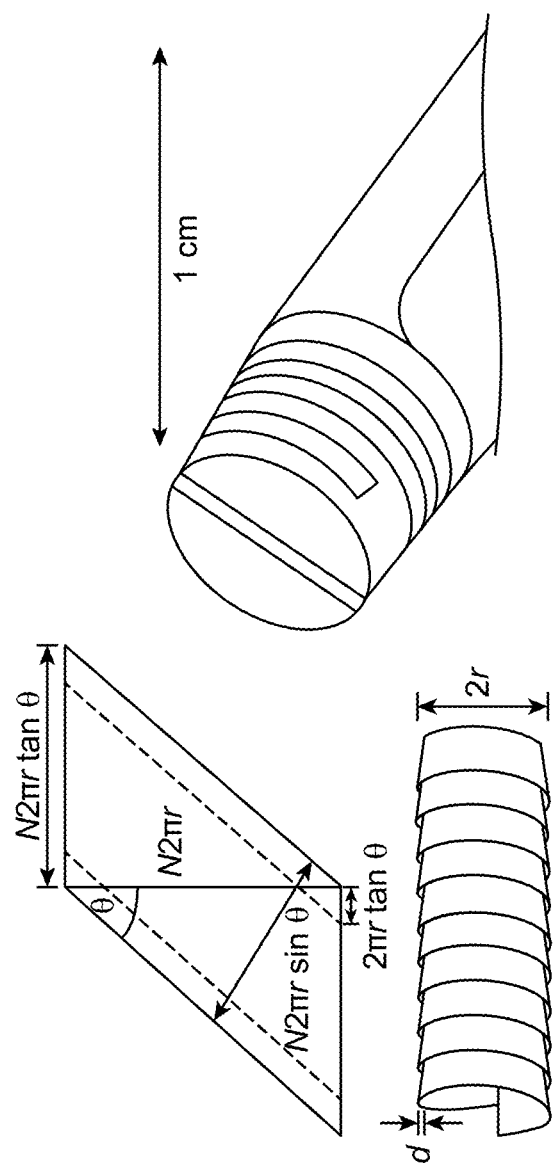
FIG. 6 is a diagram of a DNG chiral metamaterial.

FIG. 6 shows an example of an alternative design of DNG metamaterials involving chiral materials. A chiral metamaterial may be constructed of insulated metal strips wound in a helix shape, with the individual helixes stacked in a three-dimensional (3-D) arrangement to form an isotropic DNG structure. The unit cells (in other words, chiral helixes) can have internal resonances with dimensions on the order of 1/1000 (one thousandth) of the operating wavelength. This characteristic is particularly important in the design of metamaterials operating at very low frequencies (in other words, quasi-static metamaterials).

Figure 7A:
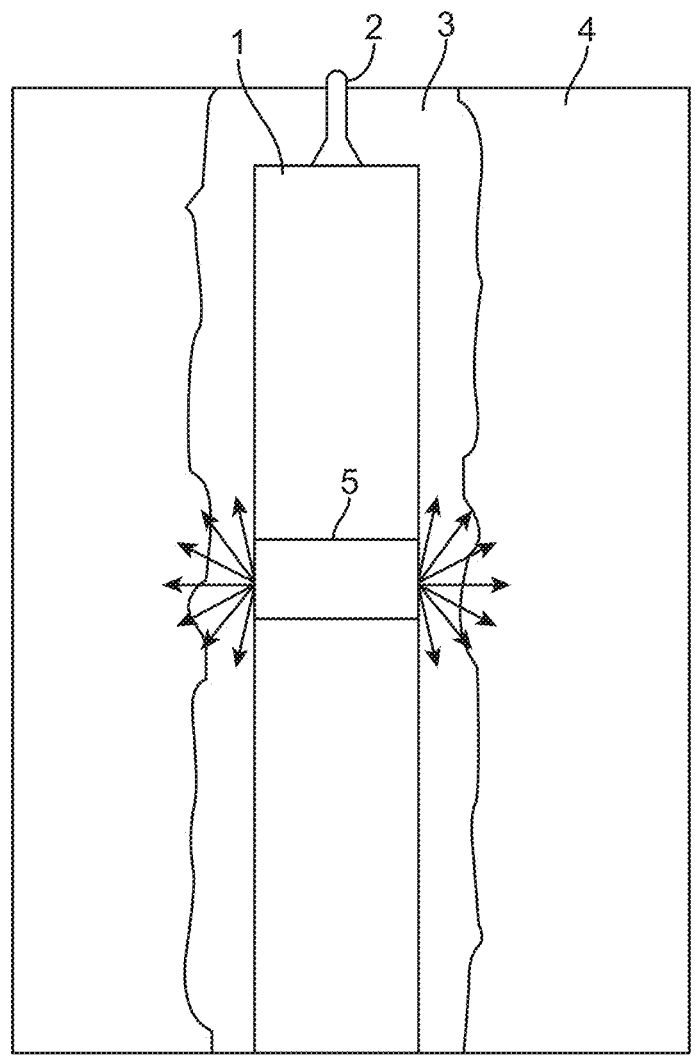
FIGS. 7A-7C are diagrams illustrating a single electrode metamaterial galvanic tool in accordance with an embodiment of the present disclosure.
Figure 7B:
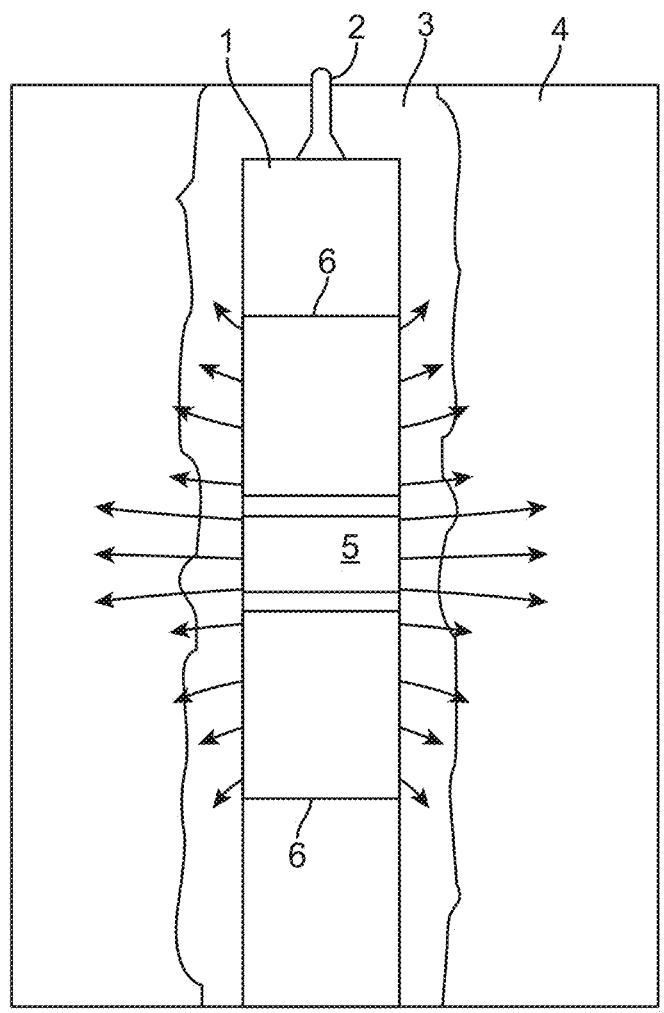
Figure 7C:
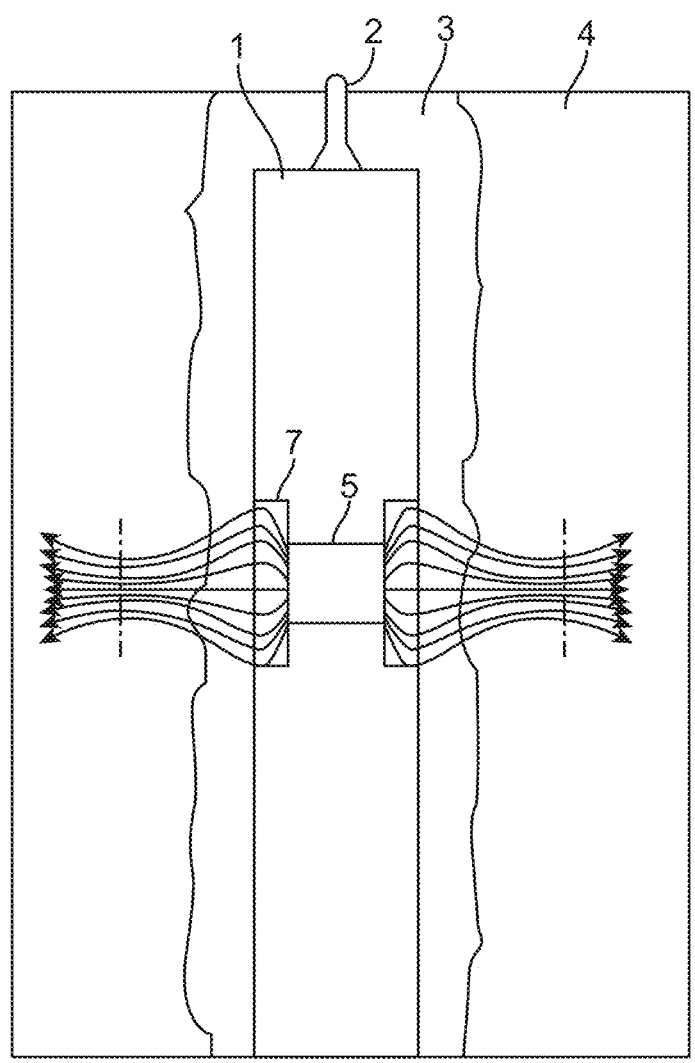
Figure 12:
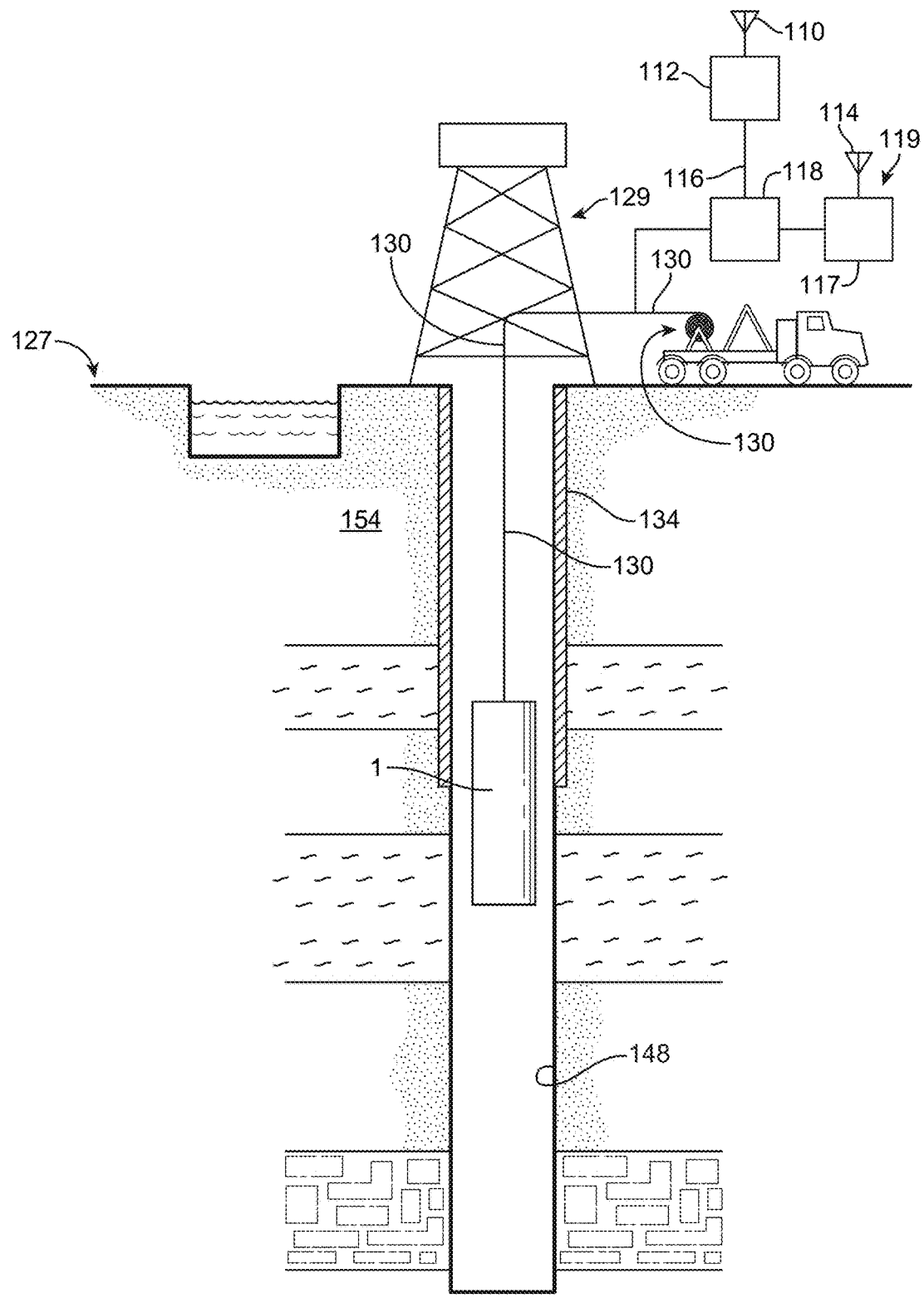
FIG. 12 is a diagram illustrating an example wireline environment for a tool employing metamaterial lens in accordance with the principles of the present disclosure.

FIGS. 7A-7C show a first embodiment of the disclosure in the form of a single current-emitting electrode galvanic tool having a metamaterial lens for axial current focusing. FIG. 7A shows a galvanic tool with tool body 1 having a conveyance 2 and electrode 5. The conveyance 2 can be a wireline, toolstring, coiled tubing, slickline, cables, E-line, or the like (FIG. 12 illustrating an exemplary deployed wireline conveyance). The tool body 1 is placed down a borehole 3 of an earth formation 4 via conveyance 2. As shown by the arrows, current flows evenly in all directions from the electrode (assuming that the electrode is embedded in a homogeneous medium), and thus is not focused in any particular direction. FIG. 7B shows a laterolog tool which adds guard electrodes 6 at each side of the single electrode 5. The guard electrodes 6 impede current flow in the vertical direction and thus provide greater directionality to the net electrode current flow into the borehole wall, focusing the electrode current in the horizontal or radial direction, thereby providing deeper penetration into the formation 4 than the single electrode tool of FIG. 7A.

FIG. 7C shows a galvanic tool with tool body 1 having a metamaterial current lens 7 surrounding the electrode 5. The metamaterial lens 7 focuses the current flowing from the electrode 5 in the horizontal (radial) direction for enhanced resolution, thereby achieving the performance of a three-electrode laterolog tool using only one electrode. In addition, the metamaterial lens 7 shifts the focusing plane of the current (as shown in dashed lines) away from the tool body 1 as compared to conventional laterolog tools, and deeper into the formation 4. In this manner, measurements become more sensitive to zones of interest beyond the borehole 3 and the invaded zones.

Figure 8A:
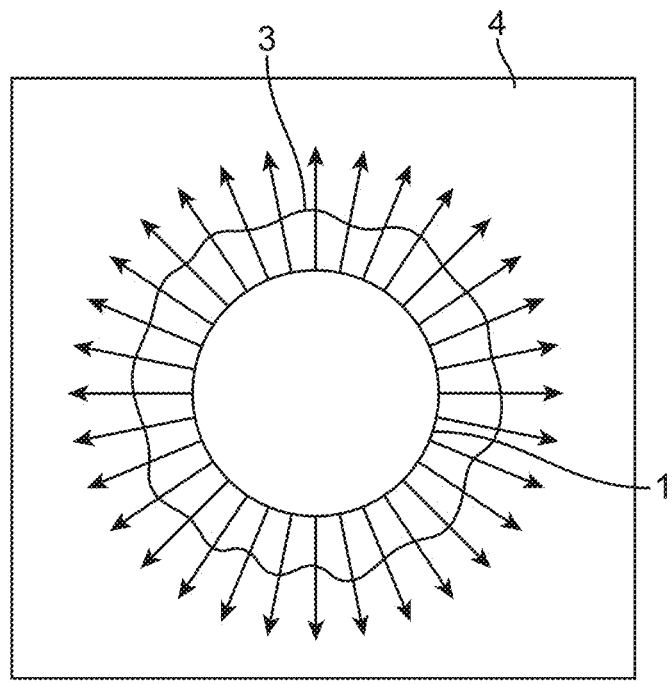
FIGS. 8A-8C are diagrams illustrating an azimuthal current focusing metamaterial lens in accordance with an embodiment of the present disclosure.
Figure 8B:
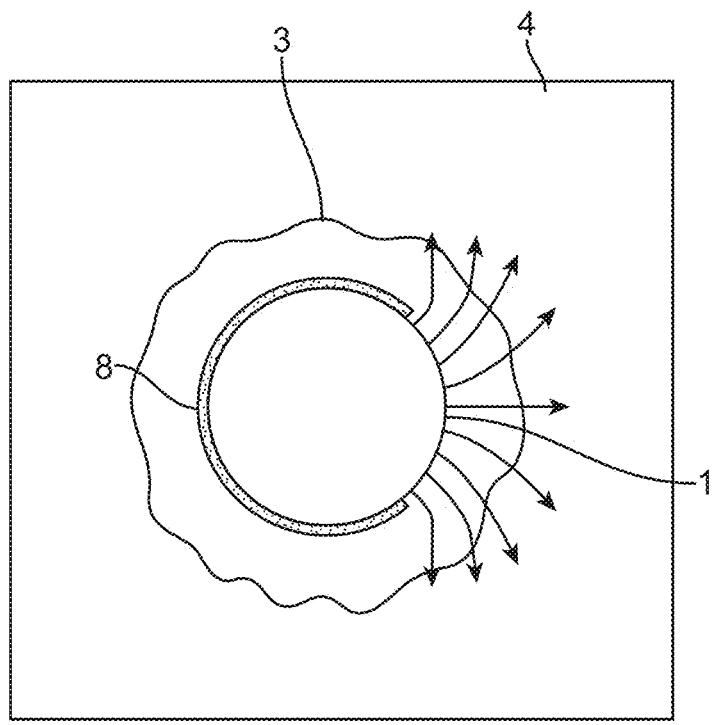
Figure 8C:
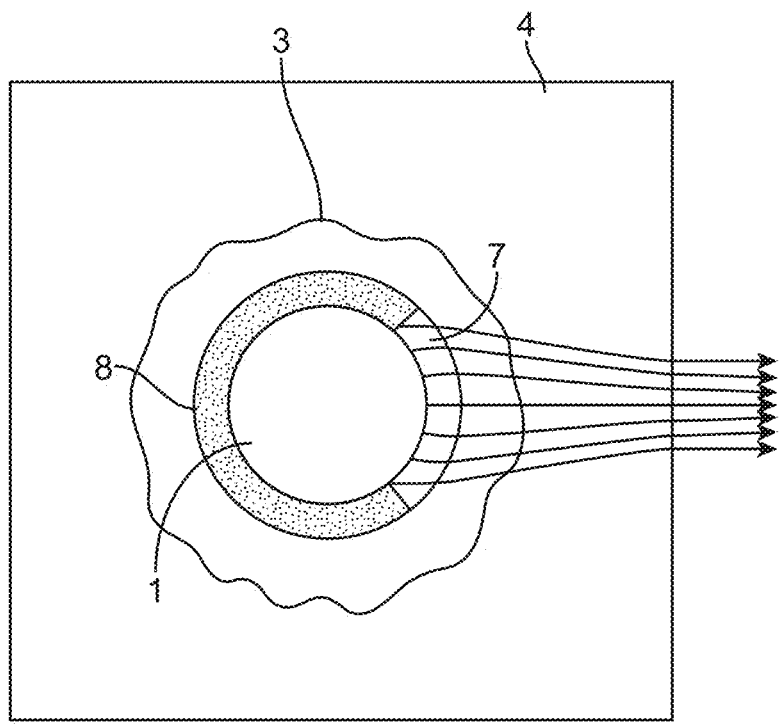

FIGS. 8A-8C illustrate an example of azimuthal current focusing using a metamaterial current lens 7 in accordance with another embodiment of the present disclosure. FIGS. 8A-8C are top plan views of the tool having tool body 1 looking down from the top at FIGS. 7A-7C; in other words, in the axial direction of the tool body 1. As illustrated in FIG. 8A, with a conventional electrode (an electrode having no insulation, not shown), current indicated by arrow lines flows in all azimuthal directions evenly (again, assuming an electrode embedded in a homogeneous medium). In FIG. 8B, an insulator material 8 is used to cover an external portion of the electrode 5 (not shown), leaving a desired section exposed. Thus, current flow is prevented in the directions covered by the insulator material 8, providing azimuthal focusing in the direction indicated by the arrow lines in FIG. 8B. However, as shown, while current flowing from the electrode 5 (not shown) is initially focused in the azimuthal direction as it leaves the surface of the electrode, the current almost immediately begins to diverge away from the focusing direction.

As shown in FIG. 8C, in accordance with the present disclosure, a metamaterial current lens 7 covers the exposed portion of the electrode. The metamaterial lens 7 focuses and collimates the current leaving the electrode for deeper azimuthal measurements, as shown. In the illustrated embodiment, the borehole mud resistivity is assumed to be equal to the formation resistivity.

Figure 9A:
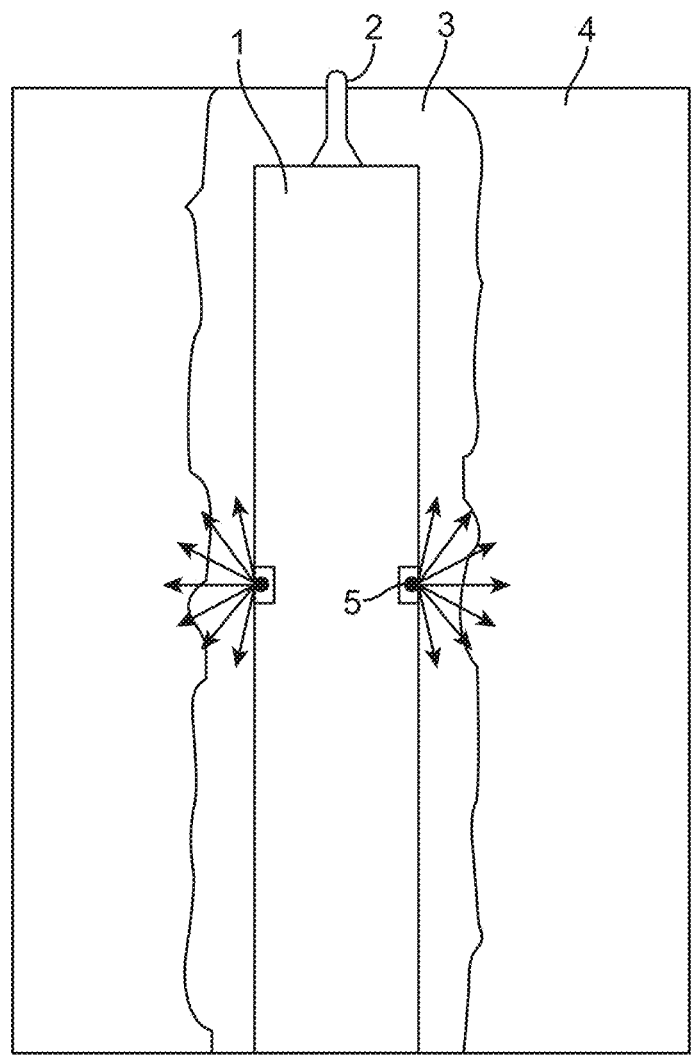
FIGS. 9A-9B are diagrams illustrating a "look-ahead" focusing metamaterial lens in accordance with another embodiment of the present disclosure.
Figure 9B:
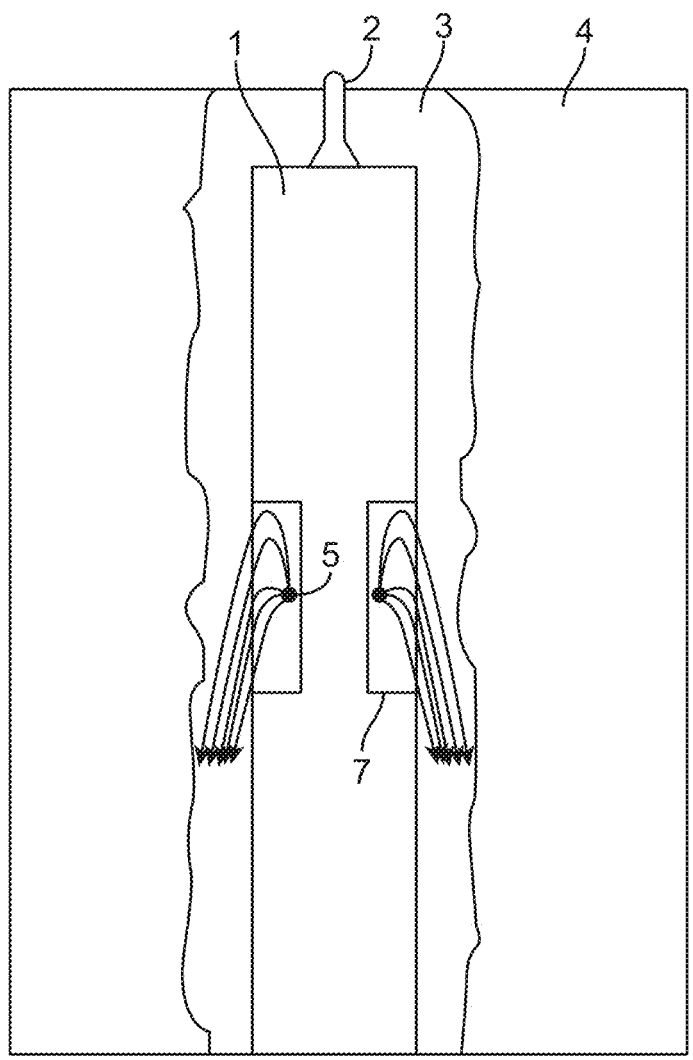

FIGS. 9A and 9B illustrate an embodiment in which a metamaterial current lens 7 is used to bend or divert current in galvanic tools or wavefront normals in induction tools, towards the head of the tool, to provide a "look-ahead" feature to conventional galvanic and induction tools. As shown in FIG. 9A by the arrow lines, in a conventional galvanic tool, current emanates from the electrode 5 in all directions originating from the plane of the electrode.

By embedding the electrodes 5 in a suitably designed metamaterial "look-ahead" lens 7, as shown in FIG. 9B, the current flows may be directed forward toward the head of the tool body 1, thus enabling measurements to be made at positions further downstream from the tool as the tool body 1 is lowered down the borehole 3, thereby providing an advantageous "look-ahead" at a position in the borehole 3 before the tool body 1 is advanced to that position.

Figure 10A:
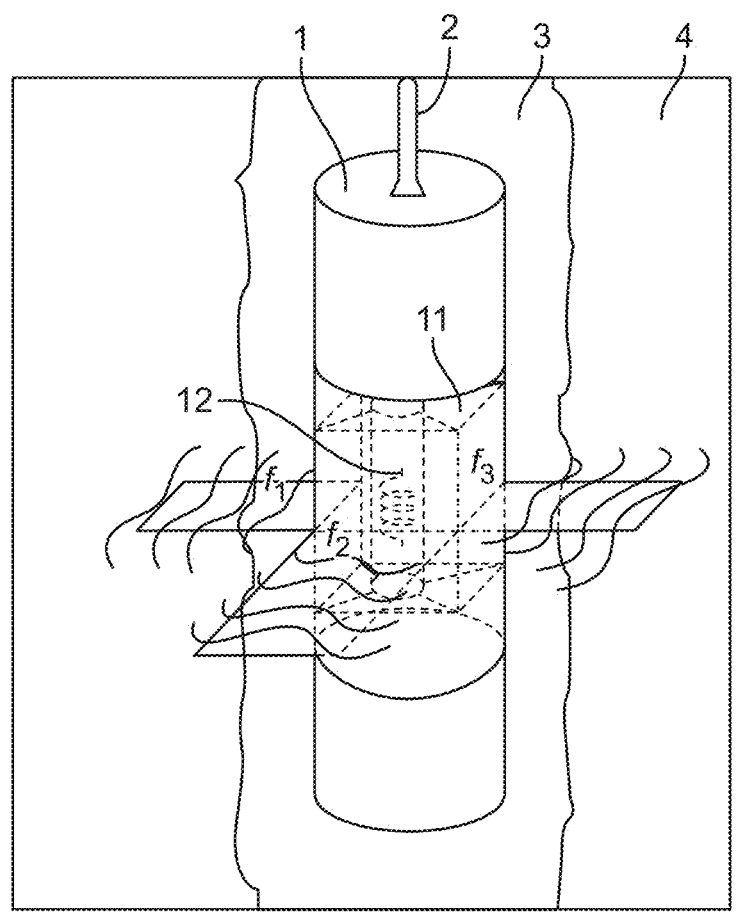
FIGS. 10A-10C are diagrams illustrating a frequency-switched azimuthal focusing metamaterial lens in accordance with yet another embodiment of the present disclosure.
Figure 10B:
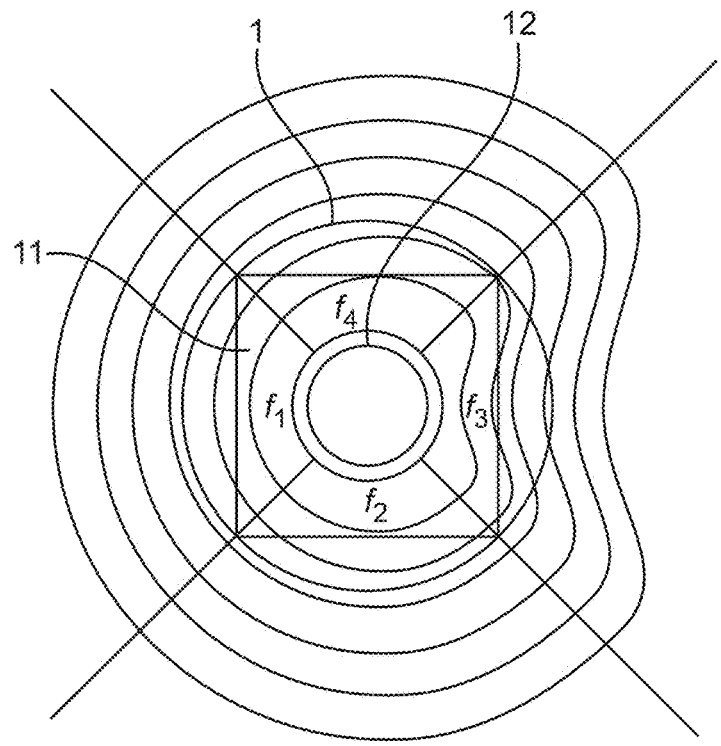
Figure 10C:
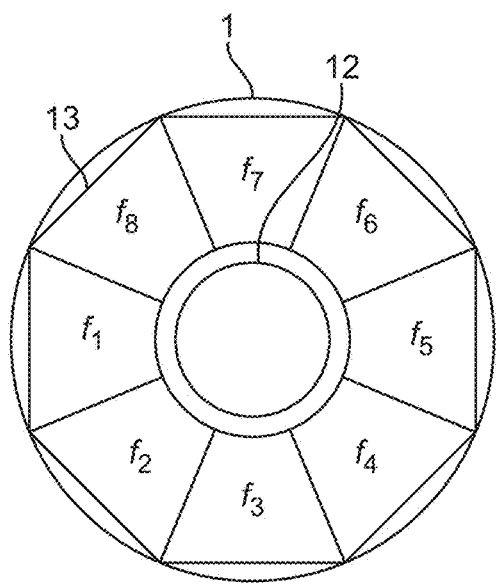

FIGS. 10A-10C show a further embodiment of the disclosure, providing a mufti-frequency metamaterial lens in an induction tool. In this embodiment, mufti-segment metamaterial 11 is placed around an electromagnetic wave emitting coil 12 in induction tool having tool body 1. FIG. 10A shows a four-segment metamaterial lens 11, each segment of which is tuned to a different frequency fn (n=1, 2, 3, 4) as shown in FIG. 10B. By tuning each segment to focus a different frequency, wavefront normals may be suitably bent or deformed as shown in FIG. 10B, where the wavefront for frequency f3 is shown. The wavefront indicates higher azimuthal activity in the direction corresponding to the segment tuned to frequency f3. For frequencies other than the focusing frequency, the metamaterial acts like a conventional material and provides no focusing action. By switching the frequency of the current sent through the coil, directional sensitivity is achieved. The number of segments may be varied as desired. For example, FIG. 10C shows an eight-frequency metamaterial lens 13.

In summary, in accordance with the present disclosure, a metamaterial lens may shift the plane of current focusing in galvanic tools to beyond the borehole and the invaded zone so that measurements become more sensitive to the formation under investigation, and therefore less correction is needed. Metamaterial focusing further may provide enhanced azimuthal and vertical resolutions in galvanic tools. A metamaterial focusing lens adds a look-ahead capability to conventional galvanic and induction type tools, obviating more complex designs based on tilted coils. A frequency-switched metamaterial lens may provide spatial filtering that enhances the azimuthal sensitivity or current directionality of borehole imaging tools.

The metamaterials disclosed in the present disclosure can be designed according to the transformation optics rules disclosed in detail above. In general, these transformation optics rules are described by inhomogeneous anisotropic permittivity and permeability tensors, whose values lie within the range of electromagnetic frequencies used in operation of such measurement tools.

As noted above, and illustrated in FIG. 11, in a working environment the tool having tool body 1 can be used in part of a drilling, logging or other operation where the tool is used downhole. A wellbore 148 is shown that has been drilled into the earth 154 from the ground's surface 127 using a drill bit 122. The drill bit 122 is located at the bottom, distal end of the drill string 132 and the bit 122 and drill string 132 are being advanced into the earth 154 by the drilling rig 129. The drilling rig 129 can be supported directly on land as shown or on an intermediate platform if at sea. For illustrative purposes, the top portion of the well bore includes casing 134 that is typically at least partially comprised of cement and which defines and stabilizes the wellbore after being drilled.

Figure 11:
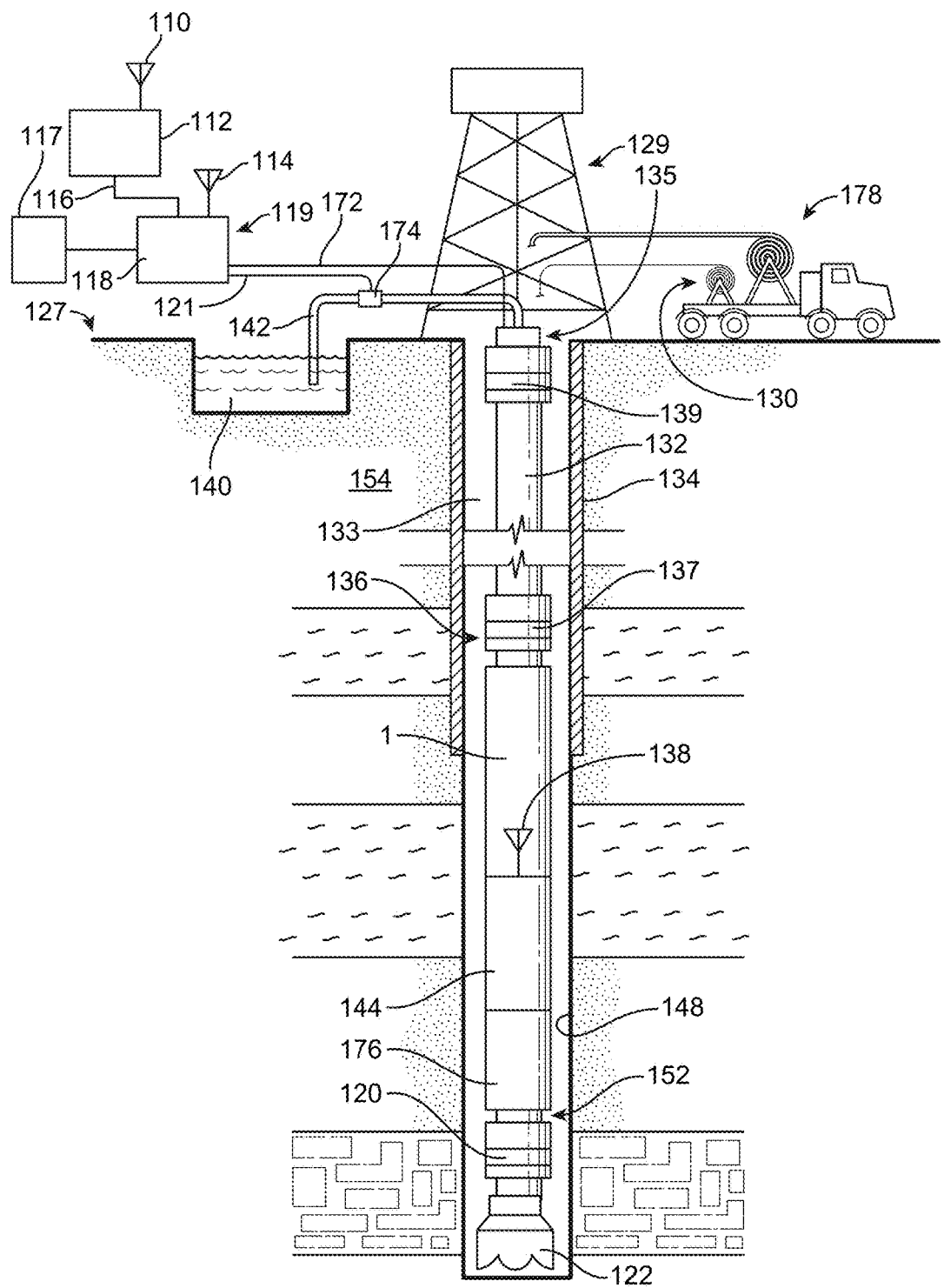
FIG. 11 is a diagram illustrating an example environment for a tool employing metamaterial lens in accordance with the principles of the present disclosure.

As shown in FIG. 11, the drill string 132 supports several components along its length. A sensor sub-unit 152 is shown for detecting conditions near the drill bit 122, conditions which can include such properties as formation fluid density, temperature and pressure, and azimuthal orientation of the drill bit 122 or string 132. In the case of directional drilling, measurement while drilling (MWD)/logging while drilling (LWD) procedures are supported both structurally and communicatively. The instance of directional drilling is illustrated in FIG. 11.

The lower end portion of the drill string 132 can include a drill collar proximate the drilling bit 122 and a rotary steerable drilling device 120. The drill bit 122 may take the form of a roller cone bit or fixed cutter bit or any other type of bit known in the art. The sensor sub-unit 152 is located in or proximate to the rotary steerable drilling device 120 and advantageously detects the azimuthal orientation of the rotary steerable drilling device 120. Other sensor sub-units 135, 136 are shown within the cased portion of the well which can be enabled to sense nearby characteristics and conditions of the drill string, formation fluid, casing and surrounding formation. Regardless of which conditions or characteristics are sensed, data indicative of those conditions and characteristics is either recorded downhole, for instance at the processor 144 for later download, or communicated to the surface either by wire using repeaters 137,139 up to surface wire 172, or wirelessly or otherwise. If wirelessly, the downhole transceiver (antenna) 138 can be utilized to send data to a local processor 18, via topside transceiver (antenna) 114. There the data may be either processed or further transmitted along to a remote processor 112 via wire 116 or wirelessly via antennae 114 and 110.

Coiled tubing 178 and wireline conveyance 130 procedures are schematically indicated in FIG. 11 which can be deployed into the wellbore 148 upon removal of the drill string 132 (wireline conveyance 130 further illustrated in FIG. 12 as discussed below). The possibility of an additional mode of communication is contemplated using drilling mud 140 that is pumped via conduit 142 to a downhole mud motor 176. The drilling mud is circulated down through the drill string 132 and up the annulus 133 around the drill string 132 to cool the drill bit 122 and remove cuttings from the wellbore 148. For purposes of communication, resistance to the incoming flow of mud can be modulated downhole to send backpressure pulses up to the surface for detection at sensor 174, and from which representative data is sent along communication channel 121 (wired or wirelessly) to one or more processors 118, 112 for recordation and/or processing.

The sensor sub-unit 152 is located along the drill string 132 above the drill bit 122. The sensor sub-unit 136 is shown in FIG. 11 positioned above the mud motor 176 that rotates the drill bit 122. Additional sensor sub-units 135, 136 can be included as desired in the drill string 132. The sub-unit 152 positioned below the motor 176 communicates with the sub-unit 136 in order to relay information to the surface 127.

A surface installation 119 is shown that sends and receives data to and from the well. The surface installation 119 can exemplarily include a local processor 118 that can optionally communicate with one or more remote processors 112, 117 by wire 116 or wirelessly using transceivers 110, 114.

In alternative examples, due to increased power requirements, or desire for reduced vibration resulting from a drill string, or other reasons, the tool having tool body 1 can be employed with "wireline" systems as illustrated in FIG. 12 in order to carry out logging or other operations. For example, instead of using the drill string 132 of FIG. 11 to lower tool body 1, it can be lowered into the wellbore 148 by wireline conveyance 130 as shown in FIG. 12. The wireline conveyance 130 can be anchored in the drill rig 129 or portable means such as a truck. The wireline conveyance 130 can be one or more wires, cables, or the like. The illustrated wireline conveyance 130 provides support for the tool, as well as enabling communication between the tool processors on the surface and providing a power supply. For example, the wireline conveyance 130 is sufficiently strong and flexible to tether the tool body 1 through the wellbore 148, while also permitting communication through the wireline conveyance 130 to local processor 118 and/or remote processors 112, 117. Additionally, power can be supplied via the wireline conveyance 130 to meet power requirements of the tool.

Further, as discussed above with respect to FIGS. 7-10, the tool body 1 is depicted as being deployed on a conveyance 2, which may include the wireline conveyance 130 shown in FIG. 12. Accordingly, logging operations can be conducted by the tool via wireline in accordance with the disclosure herein.

Numerous examples are provided herein to enhance understanding of the present disclosure. A specific set of examples are provided as follows. In a first example, there is disclosed herein a well logging tool, including a tool body (1); at least one electromagnetic emitter (5, 12) coupled to the tool body; a metamaterial (7, 9, 10, 11, 13) lens coupled to the electromagnetic emitter (5, 12) to direct electromagnetic flow from the electromagnetic emitter in a desired direction with respect to the tool body (1).

In a second example, there is disclosed herein a method according to the first example, wherein the electromagnetic emitter (5, 12) is an electrode, and the electromagnetic flow is current.

In a third example, there is disclosed herein a method according to the first or second examples, wherein the metamaterial (7, 9, 10, 11, 13) surrounds the electrode (5).

In a fourth example, there is disclosed herein a method according to any of the preceding examples first to the third, further comprising an insulator (8) over a first surface portion of the electrode (5), wherein the metamaterial (7, 9, 10, 11, 13) lens is over a second surface portion of the electrode (5) to provide azimuthal current directionality.

In a fifth example, there is disclosed herein a method according to any of the preceding examples first to the fourth, wherein the electrode is embedded in the metamaterial (7, 9, 10, 11, 13) and the metamaterial (7, 9, 10, 11, 13) directs current flow toward one end of the tool body (1).

In a sixth example, there is disclosed herein a method according to any of the preceding examples first to the fifth, wherein the electromagnetic emitter (5, 12) is an induction coil (12) and the electromagnetic flow is an electromagnetic wave.

In a seventh example, there is disclosed herein a method according to any of the preceding examples first to the sixth, wherein the metamaterial (7, 9, 10, 11, 13) is a multi-segment metamaterial (7, 9, 10, 11, 13), each segment tuned to a different operating frequency.

In an eighth example, there is disclosed herein a method according to any of the preceding examples first to the seventh, wherein the multi-segment metamaterial (7, 9, 10, 11, 13) comprises four segments.

In a ninth example, there is disclosed herein a method according to any of the preceding examples first to the eighth, wherein the multi-segment metamaterial (7, 9, 10, 11, 13) comprises eight segments.

In a tenth example, there is disclosed herein a method according to any of the preceding examples first to the ninth, wherein the tool (1) is a galvanic tool.

In an eleventh example, there is disclosed herein a method according to any of the preceding examples first to the tenth, wherein the tool (1) is an induction tool.

In a twelfth example, there is disclosed herein a method according to any of the preceding examples first to the eleventh, wherein the metamaterial (7, 9, 10, 11, 13) surrounds the coil.

In a thirteenth example, there is disclosed herein a method of directing electromagnetic flow including: positioning a logging tool (1) within a borehole in a subterranean formation; emitting an electromagnetic flow from the tool into the formation; directing the electromagnetic flow in a desired direction with a metamaterial metamaterial (7, 9, 10, 11, 13) coupled to the tool (1).

In a fourteenth example, there is disclosed herein a method according to the thirteenth example, wherein the metamaterial is a metamaterial (7, 9, 10, 11, 13) lens coupled to an electromagnetic emitter (5, 12), wherein an electromagnetic emitter (5, 12) is coupled to the tool (1).

In a fifteenth example, there is disclosed herein a method according to the thirteenth or fourteenth example, wherein the electromagnetic emitter (5, 12) is an electrode, and the electromagnetic flow is current.

In a sixteenth example, there is disclosed herein a method according to any of the preceding examples thirteenth to the fifteenth, wherein the metamaterial (7, 9, 10, 11, 13) surrounds the electrode (5).

In a seventeenth example, there is disclosed herein a method according to any of the preceding examples thirteenth to the sixteenth, wherein the electromagnetic emitter (5, 12) is an induction coil (12) and the electromagnetic flow is an electromagnetic wave.

In a eighteenth example, there is disclosed herein a method according to any of the preceding examples thirteenth to the seventeenth, wherein the tool (1) is a galvanic or induction tool.

In a nineteenth example, there is disclosed herein a method of designing a mufti-directional induction borehole imaging tool, the method including: constructing a metamaterial (7, 9, 10, 11, 13) having segments to surround a portion of an induction coil (12), locating the induction coil (12) in operative relationship with the constructed metamaterial (7, 9, 10, 11, 13); and providing the induction coil (12) and the metamaterial in a tool body (1).

In a twentieth example, there is disclosed herein a method according to the nineteenth example, wherein the metamaterial (7, 9, 10, 11, 13) is a mufti-segment metamaterial (7, 9, 10, 11, 13) wherein each segment is tuned to focus a different electromagnetic frequency, such that switching a frequency of current flow in the induction coil (12) results in altering a direction of an electromagnetic wave emanating from the metamaterial (7, 9, 10, 11, 13).

In a twenty-first example, there is disclosed herein a method according to the twentieth example, wherein the number of segments is at least four.

The embodiments shown and described above are only examples. Many details are often found in the art such as the other features of a logging system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:
1. A well logging tool, comprising:
 a tool body;
 at least one electromagnetic emitter coupled to the tool body;
 a metamaterial lens coupled to the electromagnetic emitter to direct electromagnetic flow from the electromagnetic emitter in a desired direction with respect to the tool body;
 wherein the electromagnetic emitter is an electrode, and the electromagnetic flow is substantially composed of current; and
 wherein the electrode is embedded in the metamaterial and the metamaterial directs current flow toward one end of the tool body.

2. The well logging tool of claim 1, wherein the metamaterial surrounds the electrode.

3. The well logging tool of claim 1, further comprising an insulator over a first surface portion of the electrode, wherein the metamaterial lens is over a second surface portion of the electrode to provide azimuthal current directionality.

4. The well logging tool of claim 1, wherein the tool is a galvanic tool.

5. The well logging tool of claim 1, wherein the electromagnetic flow is substantially composed of current with negligible magnetic fields.

6. A method of directing electromagnetic flow comprising:
positioning a logging tool within a borehole in a subterranean formation;
emitting an electromagnetic flow from the tool into the formation; and
directing the electromagnetic flow in a desired direction with a metamaterial coupled to the tool;
wherein the electromagnetic emitter is an electrode embedded in the metamaterial and the metamaterial directs electromagnetic flow toward one end of the logging tool, and the electromagnetic flow is substantially composed of current.

7. The method of claim 6, wherein the metamaterial is a metamaterial lens coupled to an electromagnetic emitter, wherein the electromagnetic emitter is coupled to the tool.

8. The method of claim 6, wherein the metamaterial surrounds the electrode.

9. The method of claim 6, wherein the logging tool is a galvanic tool.

10. The method of claim 6, wherein the electromagnetic flow is substantially composed of current with negligible magnetic fields.

11. A well logging tool, comprising:
a tool body;
at least one electromagnetic emitter coupled to the tool body;
a metamaterial lens coupled to the electromagnetic emitter to direct electromagnetic flow from the electromagnetic emitter in a desired direction with respect to the tool body;
wherein the electromagnetic emitter is an electrode, and the electromagnetic flow is substantially composed of current; and
an insulator over a first surface portion of the electrode, wherein the metamaterial lens is over a second surface portion of the electrode to provide azimuthal current directionality.

12. The well logging tool of claim 11, wherein the tool is a galvanic tool.

13. The well logging tool of claim 11, wherein the electromagnetic flow is substantially composed of current with negligible magnetic fields.

14. The well logging tool of claim 11, wherein the electrode is embedded in the metamaterial and the metamaterial directs current flow toward one end of the tool body.

* * * * *